Mar. 13, 1923.
1,448,405.
G. W. HUEY.
ELECTRICAL SYSTEM.
FILED MAR. 9, 1917.
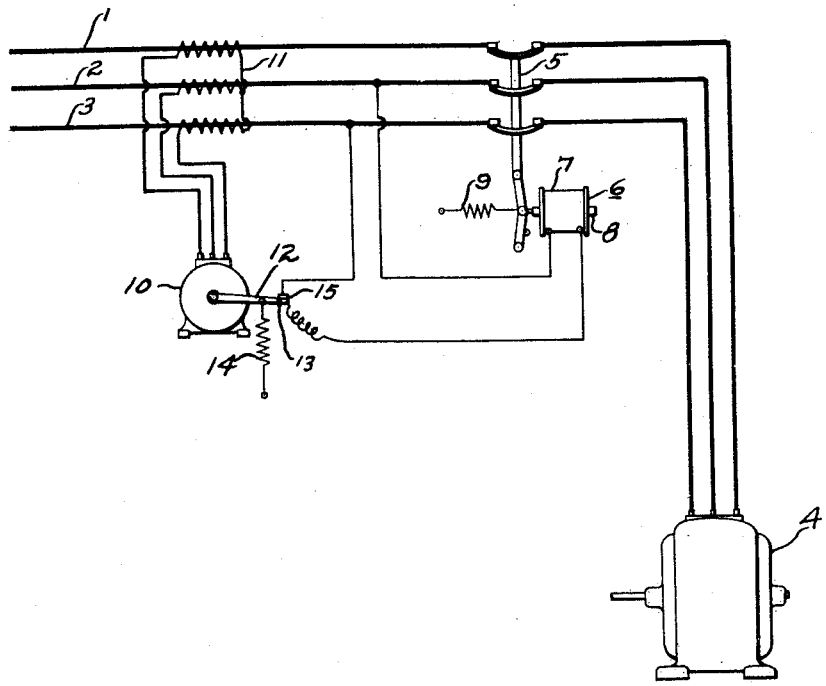
WITNESSES:
William Siler
J. R. Langley
INVENTOR
George W. Huey.
BY
ATTORNEY Patented Mar. 13, 1923.

1,448,405

UNITED STATES PATENT OFFICE.

GEORGE W. HUEY, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

Application filed March 9, 1917. Serial No. 153,548.

*To all whom it may concern:*

Be it known that I, GEORGE W. HUEY, a citizen of the United States, and a resident of Wilkinsburg, in the county of Allegheny and State of Pennsylvania, have invented a new and useful Improvement in Electrical Systems, of which the following is a specification.

My invention relates to electrical systems and particularly to such systems as embody protective devices for controlling the circuits of electric motors.

My invention has for its object to provide a simple and efficient arrangement whereby the circuits of electric motors are interrupted automatically upon the occurrence of abnormal conditions.

It is desirable, in the operation of electric motors, to disconnect them from the source of energy in case of reversal of phase of the electromotive force of the source. It is well known that, under these circumstances, the conditions obtaining in the motor circuit are approximately short-circuit conditions. It is desirable, also, to interrupt the circuits of electric motors in case of failure of voltage of the source of energy in order that full voltage may not be applied to the motors when normal conditions are restored. The circuit should be interrupted, also, upon failure of voltage in one of the line conductors.

In the arrangement constructed in accordance with my invention, I employ a small torque motor that is connected to the source of energy by any suitable means, such, for example, as a current transformer. The torque motor controls the circuit of the actuating coil of a low-voltage release device. The low-voltage release device constitutes means for tripping a circuit breaker of the usual and ordinary type. It will be readily understood that the circuit breaker operates upon the occurrence either of reversal of phase or failure of voltage of the source of energy.

In the drawing, the single figure is a diagrammatic view of circuits and apparatus embodying my invention.

Line conductors 1, 2 and 3, which may be connected to any suitable source of alternating electromotive force, supply energy to an alternating-current motor 4. The primary circuit of the motor is controlled by a circuit breaker 5. The circuit breaker is controlled by a low-voltage release device 6 having an actuating coil 7 and a movable core member 8 which opposes the force of a spring 9. The spring 9 tends to open the circuit breaker.

The circuit of the low-voltage release coil 7 is controlled by a three-phase torque motor 10 that is supplied with energy from line conductors 1, 2 and 3 by means of a current transformer 11. The rotor of the torque motor 10 is operatively connected to an arm 12 which carries a contact member 13. A spring 14 tends to retain the arm 12 in such position that the contact member 13 is out of engagement with a stationary contact member 15. Under normal operating conditions, the motor 10 exerts a force which exceeds that of the spring 14 and maintains the engagement of the contact members 13 and 15.

It may be assumed that the motor 4 is operating under normal conditions and that the various switching devices occupy their respective illustrated positions. In case of failure of line voltage, the coil 7, which is connected between line conductors 2 and 3, is deenergized and the spring 9 effects the opening of the circuit breaker 5. It is then necessary for the motor to be started in the usual manner.

In case of failure of voltage of one conductor, or failure of phase, which may be caused by the breaking of a conductor or the blowing of a fuse, the torque motor 10, which normally tends to rotate the arm 12 in a counter-clockwise direction, permits the spring 14 to rotate the arm 12 in a clockwise direction to effect disengagement of contact members 13 and 15. The coil 7 is thereupon de-energized and the circuit breaker 5 opens as described in connection with the failure of line voltage.

If the phase relations of the transmission line are reversed, the torque of the motor 10 is reversed and the arm 12 is actuated to effect the disengagement of contact members 13 and 15 in the manner previously described. The circuit breaker 5 then opens the motor circuit.

The arrangement, whereby a single circuit-controlling device is controlled in accordance with both voltage conditions and phase relations of the source of energy, requires apparatus of simple and inexpensive nature. The provision of a torque motor, which may be small in size and simple in construction, for controlling the circuit of the coil of the low-voltage release device insures the opening of the circuit upon reversal of the phase of the source of energy since the torque exerted by the motor is directly dependent upon phase relations.

I claim as my invention:

1. In an electrical system, the combination with an electric circuit, of a switch for closing said circuit, an auxiliary circuit for maintaining said switch closed, a switch for closing said auxiliary circuit, phase responsive means energized by said first circuit for maintaining said second switch closed, means for opening said second switch upon failure of voltage or reversal of phase relations in said first circuit, and means for thereupon opening said first switch.

2. In an electrical system, the combination with an electric circuit, of a switch for closing said circuit, an actuating coil for closing said switch, a stationary contact member and a movable contact member in the circuit of said coil, a torque motor controlled by said first circuit for actuating said movable contact member into engagement with said stationary contact member, means for causing disengagement of said contact members upon the de-energization or reversal of said first circuit to break the circuit of said coil and means for thereupon opening said switch.

3. In an electrical system, the combination with an electrical circuit and a controlling device therefor, of means for controlling the operation of said device, said means comprising a low-voltage release coil, a switch for controlling the energization of said coil, and a torque motor for actuating said switch in accordance with phase relations obtaining in said circuit.

4. In an electrical system, the combination with an alternating-current circuit and a device for interrupting said circuit, of an electromagnet for retaining said device in operative position under normal conditions, and means, comprising a torque motor energized from said circuit, for effecting the de-energization of said electromagnet upon the occurrence either of failure of voltage, failure of phase or reversal of phase relations in said circuit.

5. In an electrical system, the combination with a polyphase electric circuit, of a switch for controlling said circuit, an auxiliary low-voltage holding coil circuit for maintaining said switch closed, a switch for closing said auxiliary circuit, a polyphase motor responsive to the currents traversing the various phases of the polyphase circuit for actuating the second switch whereby the second switch is opened upon failure or reversal of phase relations in the polyphase circuit, to thus de-energize the holding coil circuit and permit the first switch to open.

6. In an electrical system, the combination with an alternating-current circuit and a device for interrupting said circuit, of an electromagnet connected across the circuit for retaining said device in operative position under normal voltage conditions, and means, comprising a torque motor energized in accordance with the current traversing the circuit, for effecting the de-energization of said electromagnet upon the occurrence of either failure of voltage, failure of phase or reversal of phase relations in said circuit.

In testimony whereof, I have hereunto subscribed my name this 27th day of Feb. 1917.

GEORGE W. HUEY.